June 5, 1956 — G. C. FRICKE ET AL — 2,749,265
METHOD OF MAKING PLEATED PAPER FILTER ELEMENTS
Filed Nov. 5, 1953 — 3 Sheets-Sheet 1

INVENTOR.
GUY C. FRICKE
CHARLES P. HANSON
BY Robert C. Smith
ATTORNEY

June 5, 1956     G. C. FRICKE ET AL     2,749,265
METHOD OF MAKING PLEATED PAPER FILTER ELEMENTS
Filed Nov. 5, 1953     3 Sheets-Sheet 2

INVENTOR
GUY C. FRICKE
CHARLES P. HANSON
BY
ATTORNEY

June 5, 1956 G. C. FRICKE ET AL 2,749,265
METHOD OF MAKING PLEATED PAPER FILTER ELEMENTS
Filed Nov. 5, 1953 3 Sheets-Sheet 3

INVENTOR.
GUY C. FRICKE
CHARLES P. HANSON
BY
Robert C. Smith
ATTORNEY

United States Patent Office 2,749,265
Patented June 5, 1956

2,749,265

METHOD OF MAKING PLEATED PAPER FILTER ELEMENTS

Guy C. Fricke and Charles P. Hansen, Detroit, Mich., assignors to Bendix Aviation Corporation, South Bend, Ind., a corporation of Delaware Application November 5, 1953, Serial No. 390,350

4 Claims. (Cl. 154—83)

This invention relates to filters, and more particularly to filters of the pleated paper type and to a method of making that type of filter.

In the past it has been the practice to make disposable pleated filter elements by forming a cylindrical core, and then wrapping pleated material around it. This has disadvantages, both from the standpoint of the difficulty of working on the rounded surface, and the almost impossibility of achieving the uniform spacing of pleats necessary for uniform filtering action. Of course, it is highly desirable that the pleats retain their even spacing under the pressures encountered in lubricatting systems. It is, therefore, one of the objects of our invention to provide a method for producing a filter which is uniform in its action, and maintains its uniformity through maintenance of positive spacing of the pleats in use.

Another object is to provide a simple method for producing an efficient pleated filter element.

A further object is to provide a method for producing a filter element containing no metal and yet strong enough to withstand the high pressures found in lubricating systems.

A further object is to provide a method of fabricating a filter which will result in less storage space required for materials during fabrication.

A further object is to provide a pleated filter element of simple design, in which uniformity of action is assured, through positive spacing of the pleats, and which is easily fabricated.

Other objects and advantages of the present invention will become apparent from the following description and accompanying drawings, wherein.

Figures 3, 6:
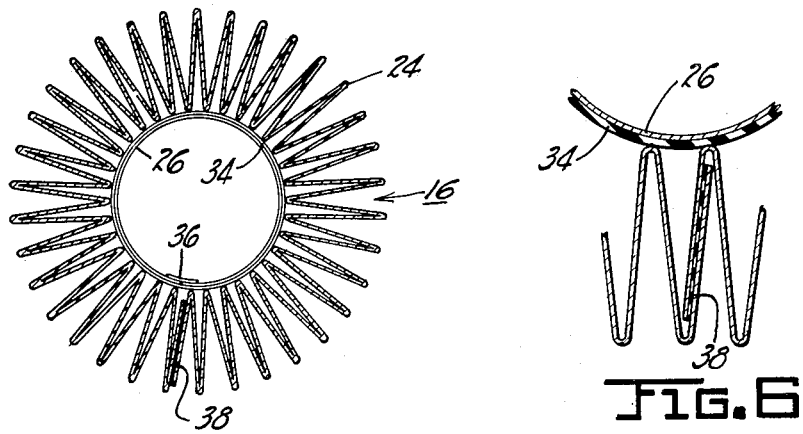
Figure 3 is a vertical section on line 3—3 of Figure 2 with the outer wrapper removed.
Figure 7:
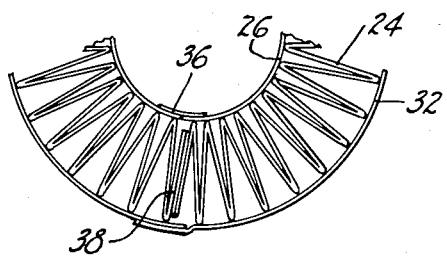

Figure 6 is an enlarged portion of Figure 3 showing the joint where the ends of the pleated paper element are bonded together and showing also the manner in which the pleats are bonded to the core; and Figure 7 is a partial end view of the element with the end plate removed, showing the lap strip used to fasten the ends of the core and the lap joint used to join the edges of the perforated outer wrapper.

Figure 1:
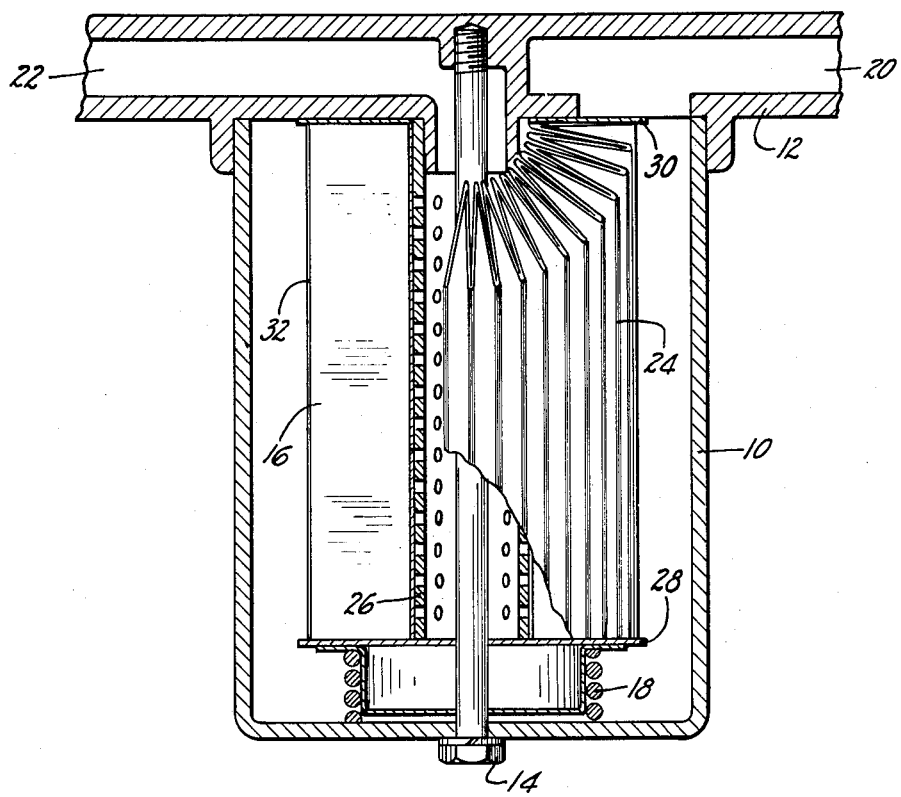
Figure 1 is a vertical cross section of a filtering device showing our filter element and the various parts thereof in operative relationship.
Figure 2:
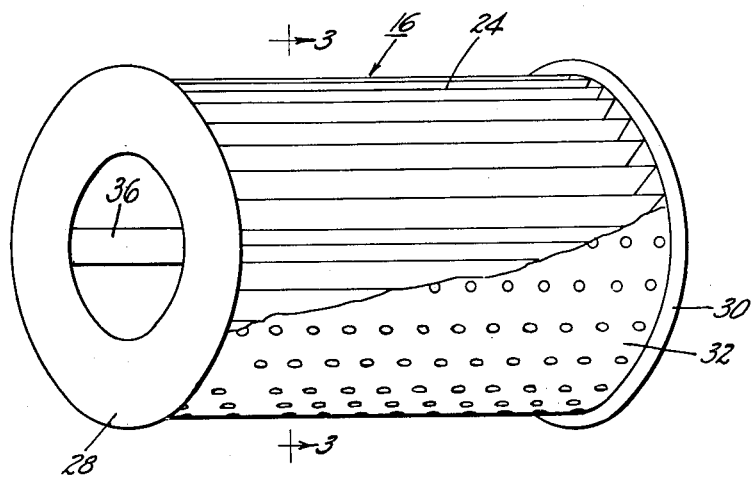
Figure 2 is a perspective view of the completed filter element with a portion of the perforated outer wrapper removed to show the pleated element.

Referring more specifically to the Figure 1, numeral 10 designates a container or bowl which is attached to a head member 12 by means of a bolt 14. Within bowl 10 is a filter element 16 which is held tightly against head member 12 by means of a spring 18. In head member 12 is provided a fluid inlet passage 20, and a fluid outlet passage 22, said inlet and outlet passages being separated from one another in the filter head in such manner as to force the fluid to be filtered through the filtering element 16. The inlet and outlet passages are provided with an annular recess for receiving suitable fittings for installation of the filter in a fuel or lubricating line or the like.

The filter element, generally designated by the numeral 16, consists of vertically pleated side walls 24 of a resinous impregnated paper attached to a hollow tube or core 26 by means of a bonding material which may be of neoprene, or any of several materials well known to the art, in such fashion that the pleats extend radially from the core. End plates 28, 30 are bonded to the ends of pleated element 16 and a perforated paper outer wrapper 32 is cemented to the outside folds of the pleats.

In the normal operation of the present filter, fluid enters inlet passage 20, passes downwardly into the bowl around the filter element 16, through the side walls of said element into the internal portion thereof, and thence flows upwardly and passes out of the filtering device through outlet passage 22.

Figure 4:
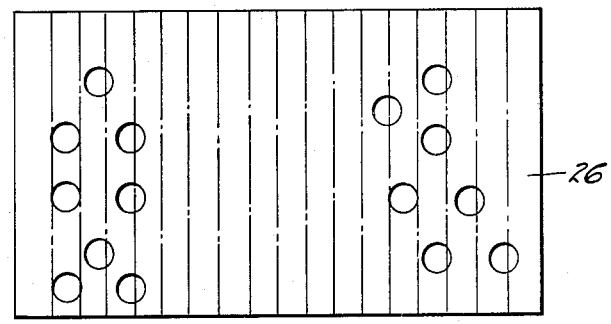
Figure 4 is a plan view of the perforated core material before the pleated element is cemented to it.
Figure 5:
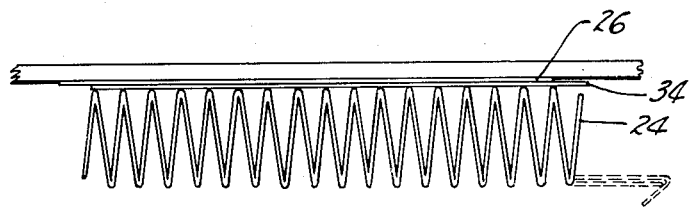
Figure 5 is an end view of the core material with the pleated element cemented to it.

Referring now to Figure 4, construction of filter element 16 begins with the flat perforated core material 26 cut to the proper dimensions. Next to this core material is placed a layer of bonding material 34 capable of fastening componets to both sides of itself. The filter element paper which is impregnated with a resinous substance such as a thermosetting phenolic condensation product is formed to the proper pleat width and circumferential length with the specified number of pleats per inch, and is placed in a polymerizing tray where it is heated to a temperature and for a time sufficient to make the fibers of the paper, but not the paper, impervious to the fluid filtered. The sheet cement 34 and the core material 26 are then placed on the pleated block 24, as shown in Figure 5. With all parts in this position, heat is applied with pressure and the parts are bonded into a single unit which may be stacked and stored for future processing, or immediately formed around the cylindrical core. When the element is so formed, the core material is butt joined with a lap strip 36 over the joint, and the pleated material is lapped and bonded as shown at numeral 38 in Figures 3, 6, and 7. The perforated outer wrapper 32 is then cemented to the outside ends of the pleats. Bonding on the end plates 28, 30 is the final step and the filter element is ready for immediate use.

We claim:

1. A method of making pleated paper filter elements having endcaps, a cylindrical core, and a perforated paper outer wrapper, comprising forming a flat sheet of resinous impregnated filter material into uniform pleats, bonding said pleated material to a flat rectangular perforated piece of core material, the pleats being thus secured in a uniform spacing relationship, forming a cylindrical core by bending the ends of said core material together and securing said ends with a lap strip thus causing said pleated material to assume a cylindrical shape, bonding the end folds of said pleated material together, bonding endcaps to each end of said pleated material, and securing said perforated outer wrapper to the outside pleats of said pleated member.

2. A method of making pleated paper filter elements having endcaps and a cylindrical core member, comprising forming a flat sheet of resinous impregnated filter material into uniform pleats, bonding said pleated material to a flat, rectangular perforated piece of core material, forming a cylindrical core by butt joining the ends of said core material together and securing said ends with a lap strip thus causing said pleated material to assume a cylindrical shape, bonding the end folds of said pleated material together, and bonding endcaps to each end of said pleated material.

3. A method of making pleated paper filter elements having endcaps and a cylindrical core, comprising forming a flat sheet of resinous impregnated filter material into uniform pleats, bonding said pleated material to a flat rectangular perforated piece of core material, forming a cylindrical core by bending the ends of said core material together and joining said ends, thus causing said pleated material to assume a cylindrical shape, bonding the end folds of said pleated material together, and bonding endcaps to each end of said pleated material.

4. A method of making pleated paper filter elements, comprising forming a flat sheet of resinous impregnated filter material into uniform pleats, bonding said pleated material to a flat rectangular perforated piece of core material, forming a cylindrical core by bending the ends of said core material together and joining said ends, thus causing said pleated material to assume a cylindrical shape, and bonding the end folds of said pleated material together.

References Cited in the file of this patent

UNITED STATES PATENTS

| | | |
|---|---|---|
| 2,395,449 | Briggs | Feb. 26, 1946 |
| 2,413,431 | Briggs | Dec. 31, 1946 |
| 2,457,958 | Walker | Jan. 4, 1949 |
| 2,556,521 | Chase | June 12, 1951 |
| 2,627,350 | Wicks | Feb. 3, 1953 |
| 2,642,187 | Bell | June 16, 1953 |
| 2,675,127 | Layte | Apr. 13, 1954 |

FOREIGN PATENTS

| | | |
|---|---|---|
| 581,105 | Great Britain | Oct. 1, 1946 |